United States Patent
Trigiani

(12) 
(10) Patent No.: US 6,186,197 B1
(45) Date of Patent: Feb. 13, 2001

(54) APPARATUS FOR CHARGING A PRESSURIZED SYSTEM

(75) Inventor: Phil Trigiani, Mississauga (CA)

(73) Assignee: UView Ultraviolet Systems, Inc., Mississauga (CA)

(*) Notice: Under 35 U.S.C. 154(b), the term of this patent shall be extended for 0 days.

(21) Appl. No.: 09/535,368

(22) Filed: Mar. 24, 2000

Related U.S. Application Data

(63) Continuation of application No. 09/003,021, filed on Jan. 5, 1998, now Pat. No. 6,050,310, which is a continuation-in-part of application No. 08/710,486, filed on Sep. 18, 1996, now Pat. No. 5,826,636.

(51) Int. Cl.[7] ...................................................... B65B 3/04
(52) U.S. Cl. ............................................ 141/382; 141/383
(58) Field of Search ................................ 141/1–4, 18, 21, 141/25–27, 382–384, 386; 222/325–327, 391; 62/292, 293

(56) References Cited

U.S. PATENT DOCUMENTS

| | | | |
|---|---|---|---|
| 1,926,399 | * | 9/1933 | Nielsen .................................. 141/27 |
| 4,197,884 | * | 4/1980 | Maran ................................... 141/383 |
| 4,467,620 | * | 8/1984 | Bradley et al. ........................ 62/292 |
| 4,948,016 | | 8/1990 | Summons et al. .................... 222/158 |
| 5,027,605 | | 7/1991 | Hardesty ................................. 62/77 |
| 5,673,722 | | 10/1997 | Brass ..................................... 137/15 |

* cited by examiner

Primary Examiner—J. Casimer Jacyna
(74) Attorney, Agent, or Firm—Bell, Boyd & Lloyd LLC

(57) ABSTRACT

An apparatus (22) for charging a pressurized system (24) comprising a lubricant canister (26). A facility (28) is for fluidly coupling the lubricant canister (26) to the pressurized system (24). An assemblage (30) is for forcing lubricant (32) out of the lubricant canister (26), through the fluidly coupling facility (28) and into a service valve (34) of the pressurized system (24).

5 Claims, 18 Drawing Sheets

APPARATUS FOR CHARGING A PRESSURIZED SYSTEM

This application is a continuation of U.S. patent application Ser. No. 09/003,021, filed Jan. 5, 1998, now U.S. Pat. No. 6,050,310, which is a continuation-in-part of U.S. patent application Ser. No. 08/710,486, filed Sep. 18, 1996, now U.S. Pat. No. 5,826,636, the entire contents of each which are hereby incorporated by reference and relied upon.

BACKGROUND OF THE INVENTION

1. Field of the Invention

The instant invention relates generally to the field of pressurized fluid systems and more specifically it relates to an apparatus for charging a pressurized system. The purpose of the charging apparatus is to provide the technician with a simple method of injecting a predetermined amount of lubricant into a pressurized system.

2. Description of the Prior Art

Numerous pressurized fluid systems have been provided in prior art that are adapted to operate optimally within a certain pressure range. If the internal pressure falls below this range, the system needs to be recharged with an appropriate lubricant. While these units may be suitable for the particular purpose to which they address, they would not be as suitable for the purposes of the present invention as heretofore described.

There does not presently exist a cost effective way to accomplish the task of inserting a predetermined amount of lubricant into a pressurized system. Added to this, is the fact that when a technician arrives on site they are faced with a myriad number of systems with service connection access ranging from the accessible to the acrobatic and often cramped working conditions.

Some systems contain a combination of fluids. For example, air conditioning and refrigerant (the primary fluid) in combination with a lubricating oil (the secondary fluid) for the compressor and other critical components. The lubricating oil is generally present in fairly fluid. The quantities, usually less than 5% of the total fluid. The present invention provides for the introduction of these secondary fluids into systems charged with the primary fluids.

SUMMARY OF THE INVENTION

The preferred embodiment of the present invention includes an injection device with a receptacle portion for receiving a disposable or reusable lubricant canister and a connector assembly for attaching the lubricant canister to the pressurized system. It is a further aim of the present invention not to limit the mechanical means of lubricant delivery just to hand pressure, but to provide other embodiments using various types of hand tools and structures to accomplish the delivery of the lubricant to the pressurized system.

A primary object of the present invention is to provide an apparatus for charging a pressurized system that will overcome the shortcomings of the prior art devices.

Another object is to provide an apparatus for charging a pressurized system that will allow a technician to inject a predetermined amount of lubricant into the pressurized system.

It is yet a further object of the invention to provide a method and apparatus for charging a pressurized air conditioning/refrigeration line with a lubricant and/or dye from a closed, non-pressurized charging cartridge containing a predetermined amount of such lubricant and/or dye.

An additional object is to provide an apparatus for charging a pressurized system which can be readily carried to a site, be easily operated, and can deliver a measured amount of lubricant into the pressurized system.

A further object is to provide an apparatus for charging a pressurized system that is simple and easy to use.

A still further object is to provide an apparatus for charging a pressurized system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Figure 12:
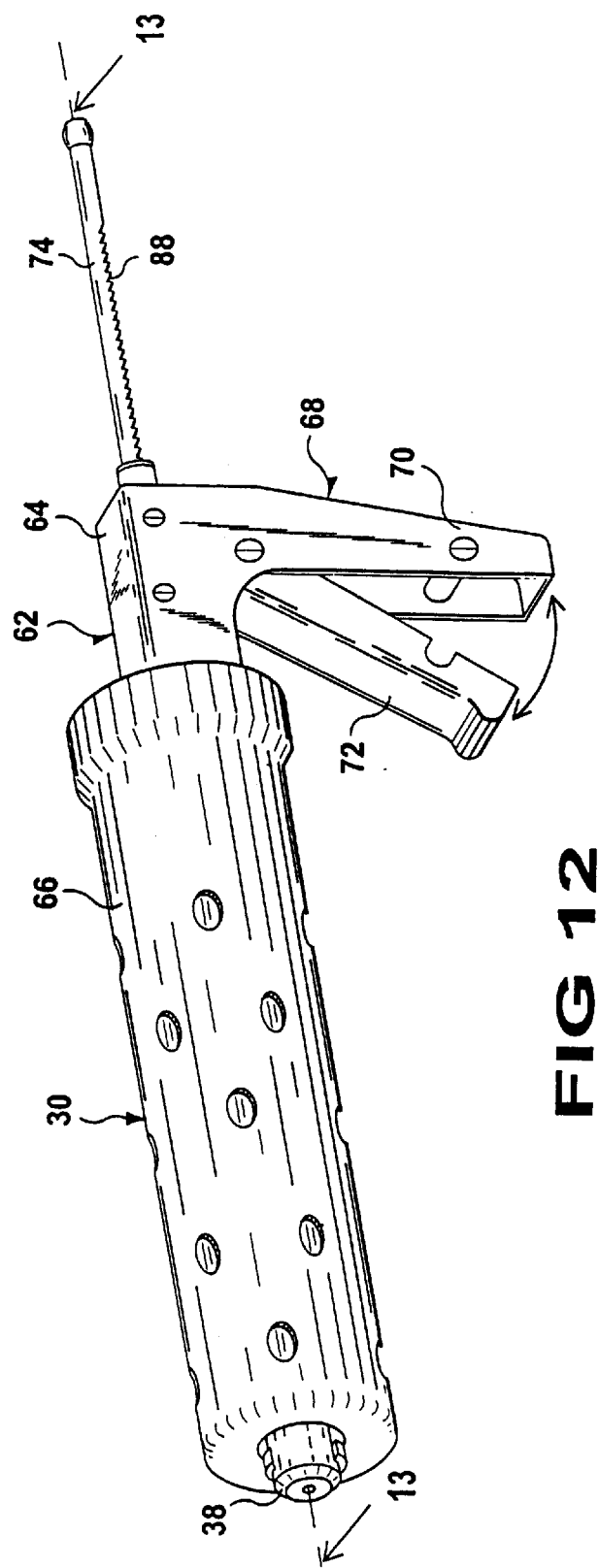

FIG. 12 a perspective view of a second embodiment of the injection device.

Figure 13:
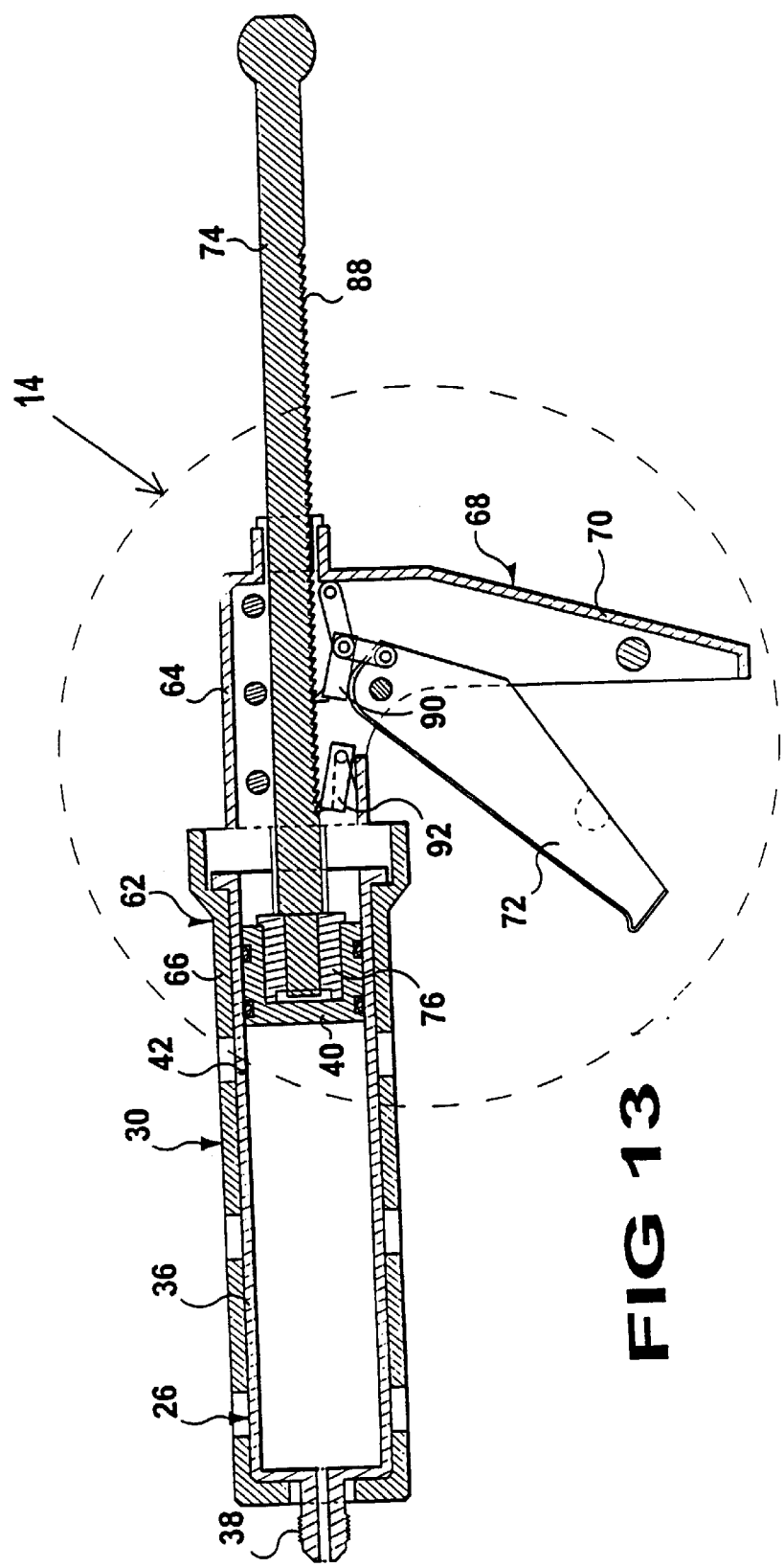

FIG. 13 is a cross sectional view taken along line 13—13 in FIG. 12.

Figure 14:
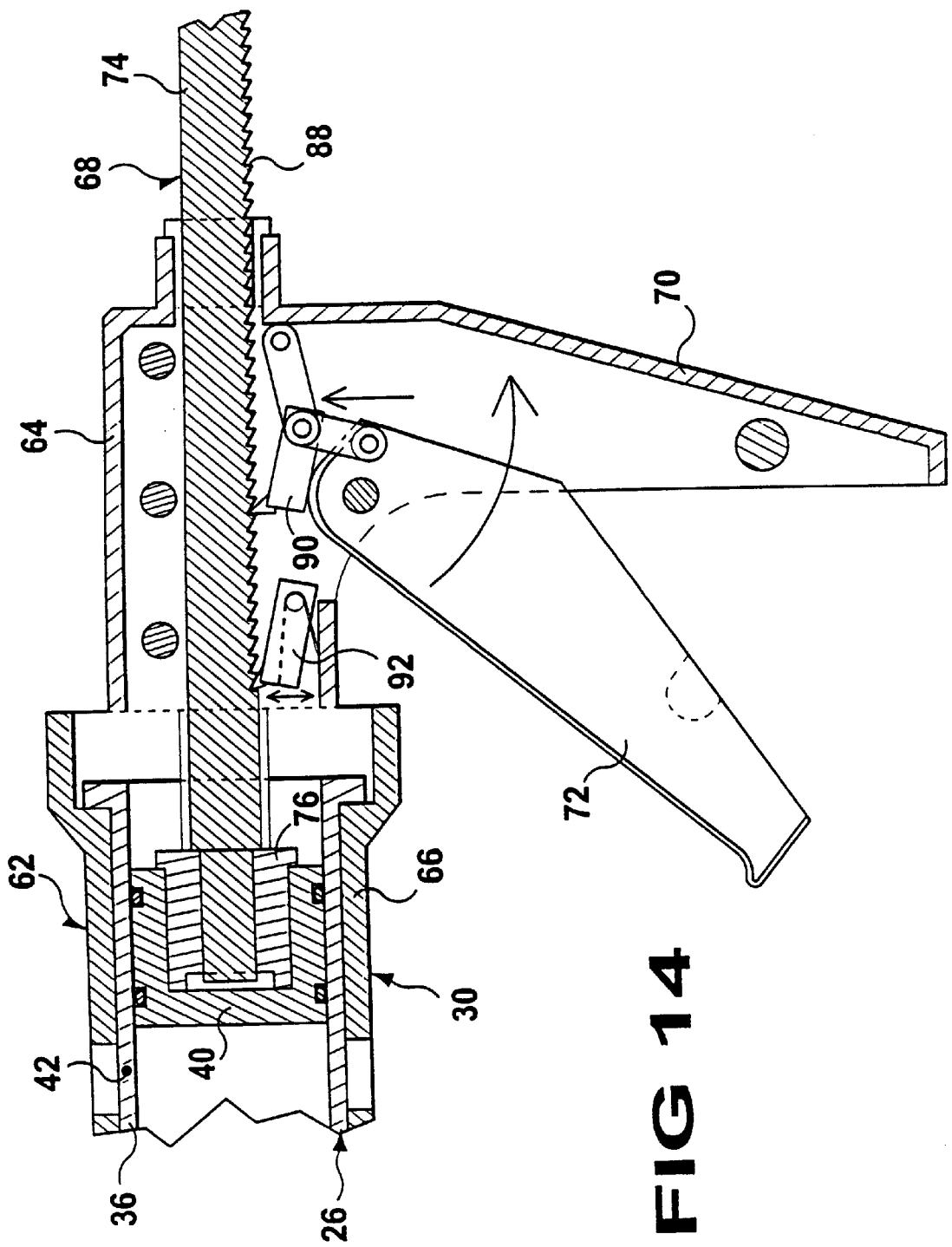

FIG. 14 is an enlarged cross sectional view of an area in FIG. 13 as indicated by arrow 14.

Figure 15:
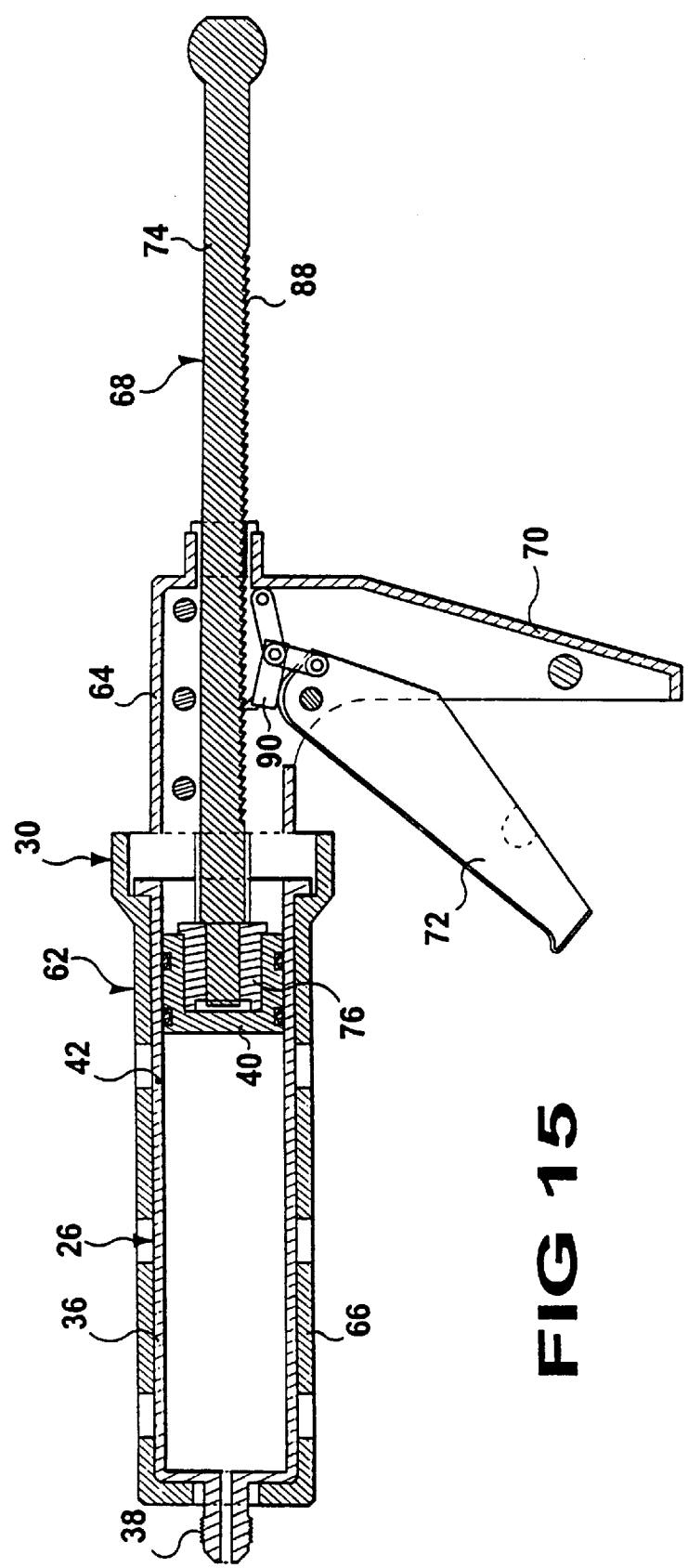

FIG. 15 is a cross sectional view similar to FIG. 13, showing a single pawl mechanism to propel the toothed central shaft in the injection device.

Figure 16:
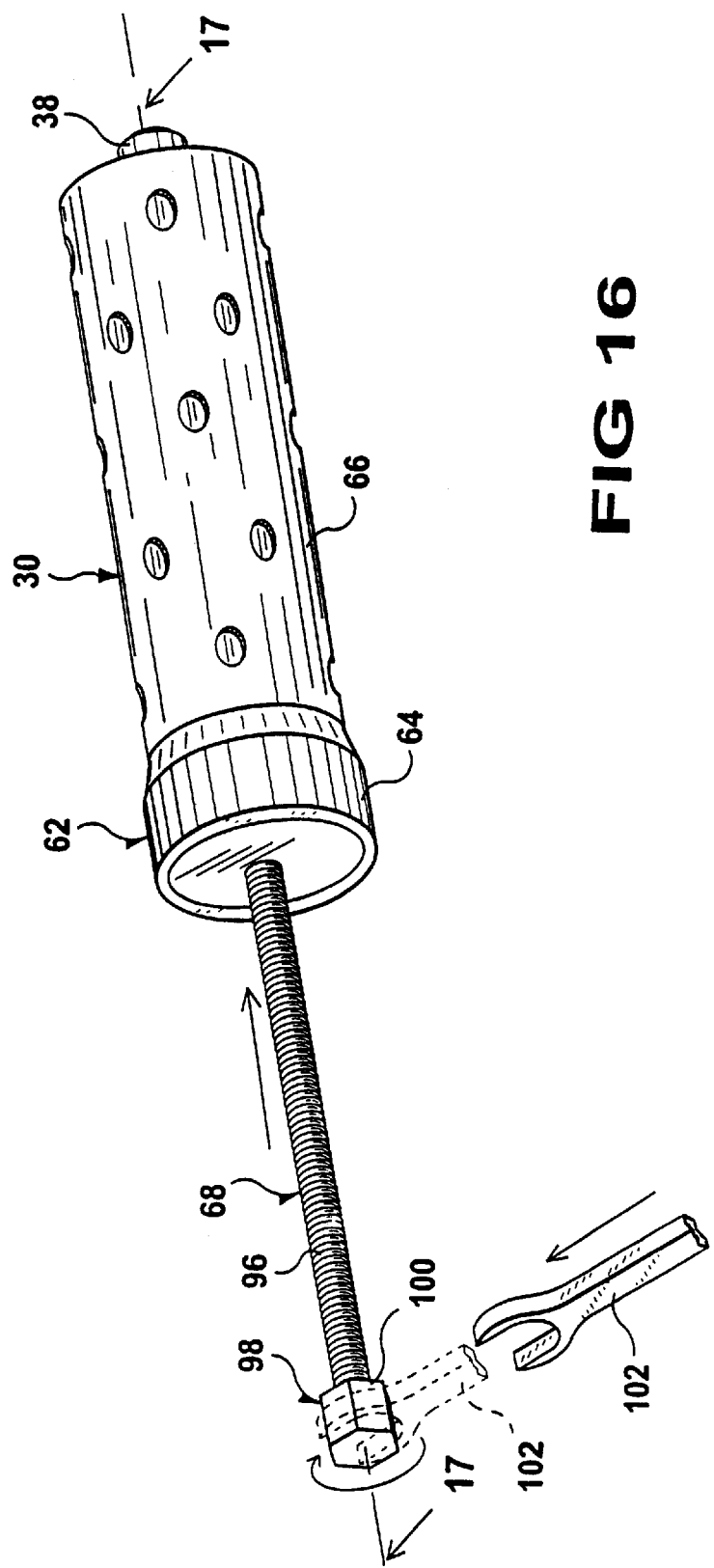

FIG. 16 is a perspective view of a third embodiment of the injection device.

Figure 17:
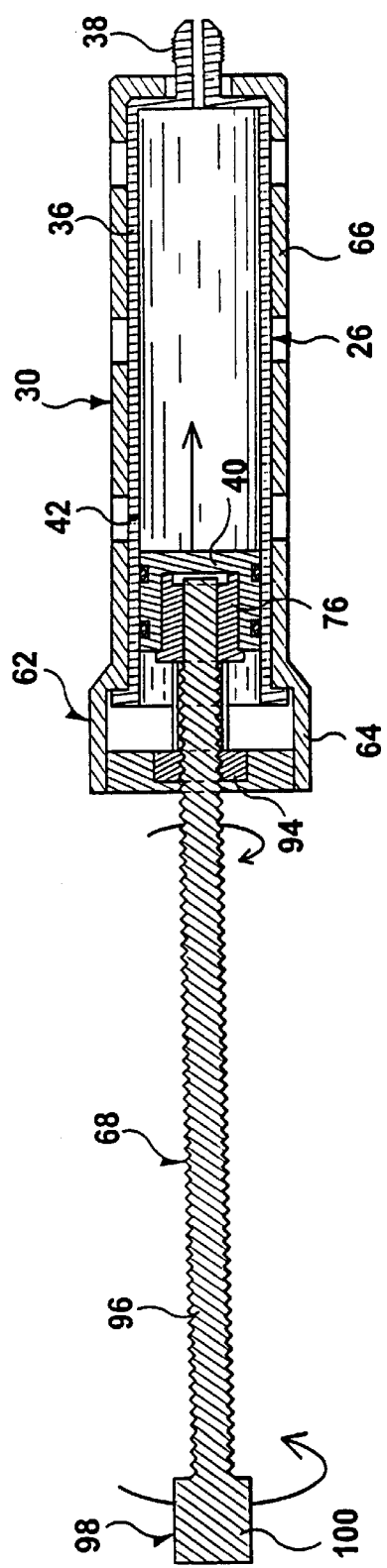

FIG. 17 is a cross sectional view taken along line 17—17 in FIG. 16.

Figure 18:
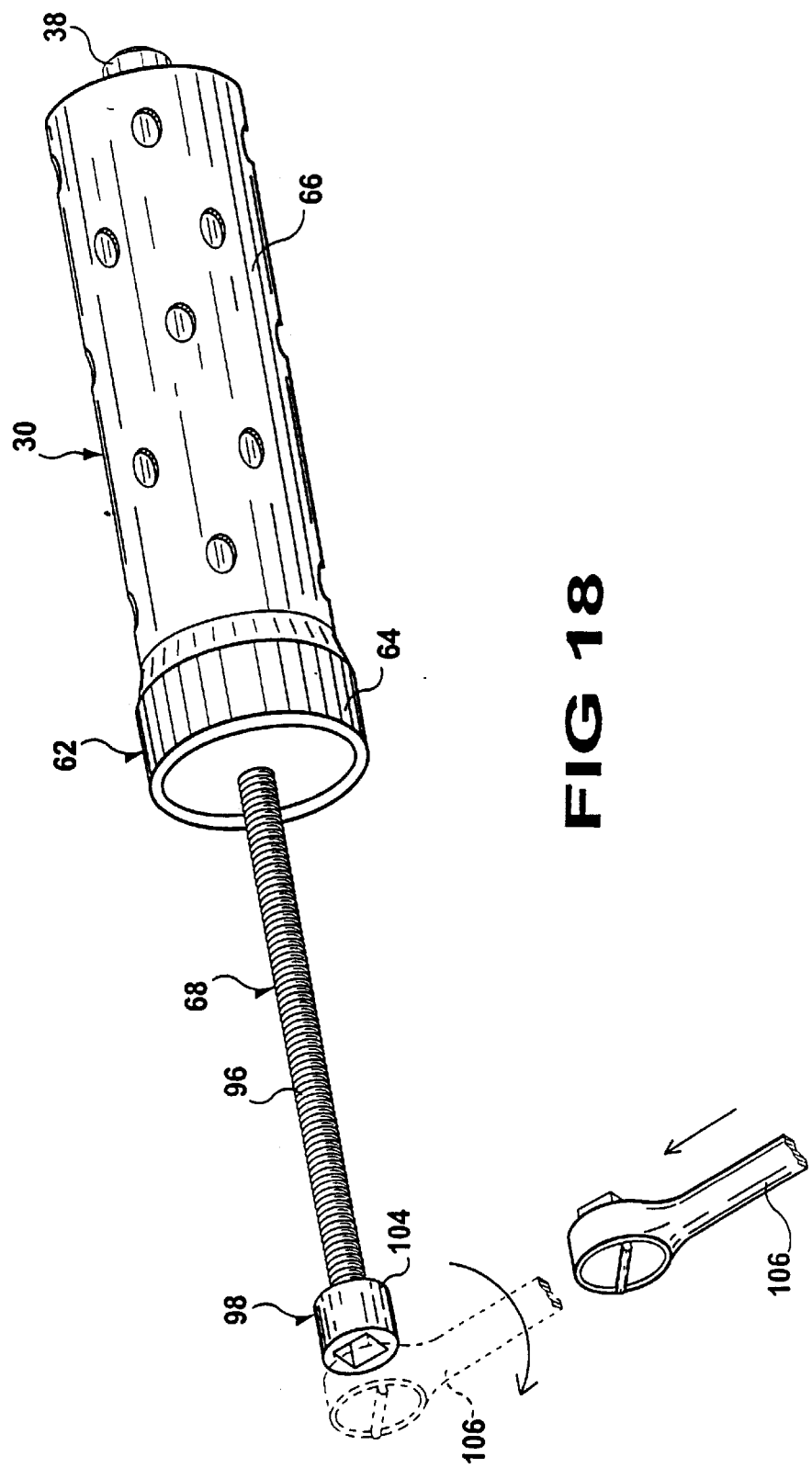

FIG. 18 is a perspective view similar to FIG. 16, showing a socket wrench to turn the operating screw in the injection device.

Figure 19:
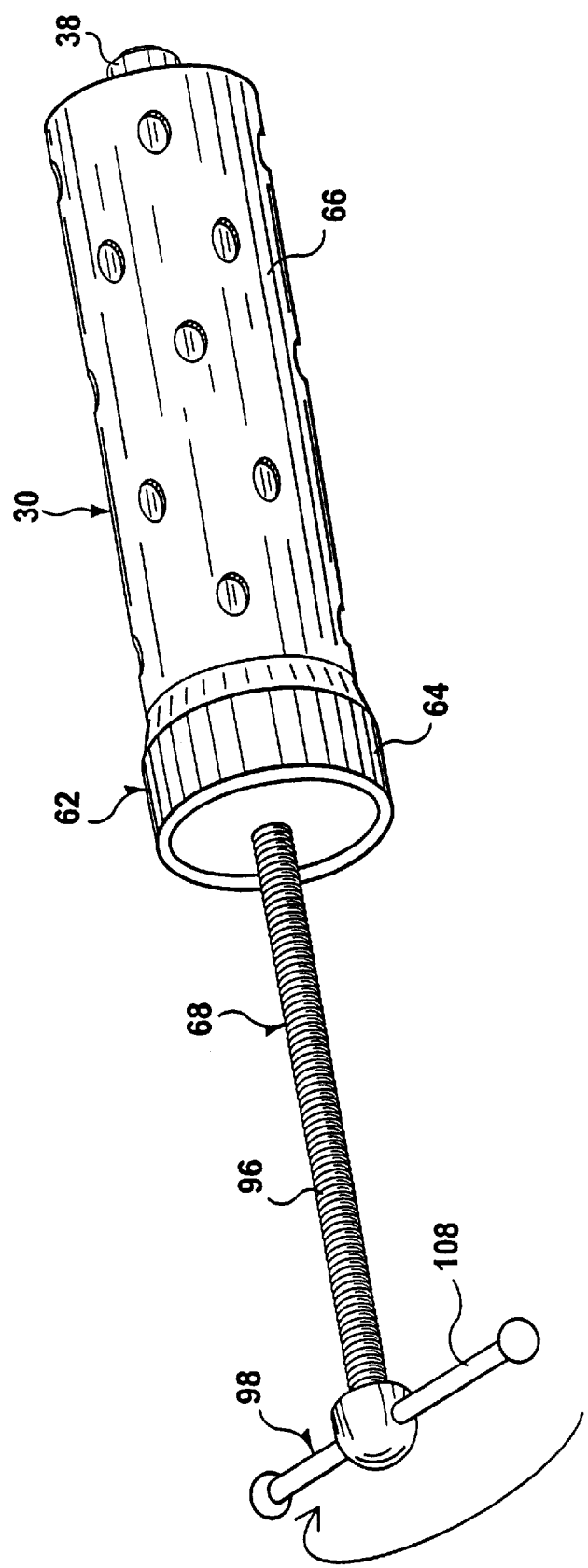

FIG. 19 is a perspective view similar to FIG. 18, showing a transverse handle to turn the operating screw in the injection device.

Figure 20:
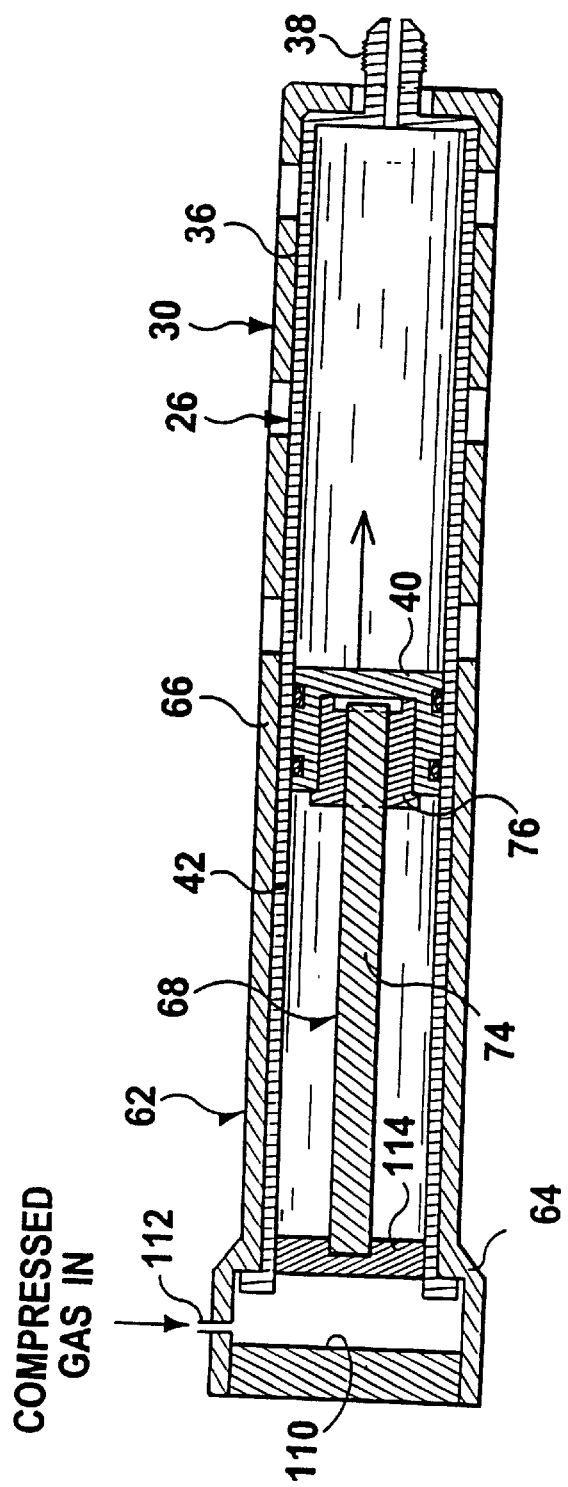

FIG. 20 is a cross sectional view of a fourth embodiment of the injection device, whereby compressed gas is introduced within a chamber to drive the piston forward in the lubricant canister.

Similar reference characters denote corresponding features consistently throughout the attached drawings.

DETAILED DESCRIPTION OF THE PREFERRED EMBODIMENTS

Figure 1:
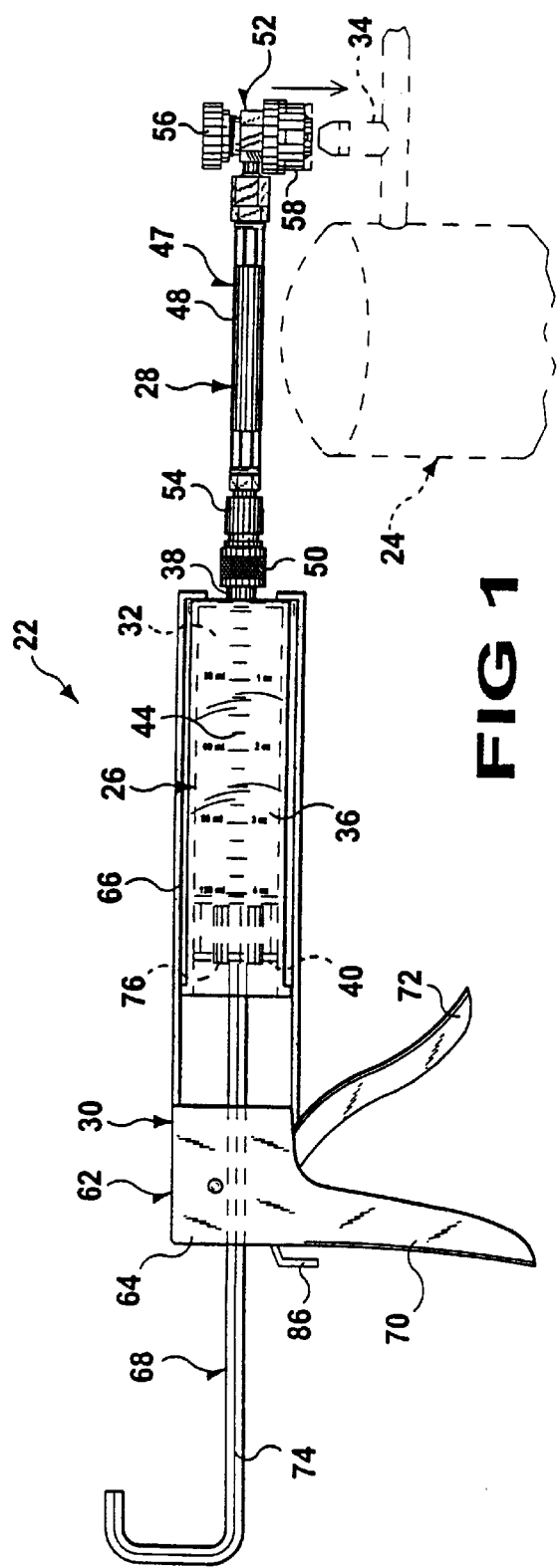
FIG. 1 is a side view of a first embodiment of the present invention.

Turning now descriptively to the drawings, in which similar reference characters denote similar elements throughout the several views, FIG. 1 illustrates the present invention being an apparatus 22 for charging a pressurized system 24. With regard to the reference numerals used, the following numbering is used throughout the various drawing figures.

| | |
|---|---|
| 22 | charging apparatus |
| 24 | pressurized system |
| 26 | lubricant canister of 22 |
| 28 | fluidly coupling facility of 22 |
| 30 | lubricant forcing assemblage of 22 |
| 32 | lubricant of 26 |
| 34 | service valve of 24 |
| 36 | tubular casing of 26 |
| 38 | threaded nozzle of 26 on 36 |
| 40 | recessed double O-ring piston of 26 in 36 |
| 42 | transparent material for 36 |
| 44 | gradient marking on 36 |
| 46 | threaded cap of 26 on 38 |
| 47 | connector assembly for 28 |
| 48 | flexible conduit of 47 |
| 50 | threaded fitting of 47 on 48 |
| 52 | release valve of 47 on 48 |
| 54 | one-way check valve of 47 |
| 56 | closeable control knob of 52 |
| 58 | snap lock fitting of 52 |
| 60 | threaded fitting of 52 |
| 62 | injection device for 30 |
| 64 | housing of 62 |
| 66 | receptacle portion of 64 |
| 68 | drive mechanism of 30 |
| 70 | hand grip of 68 |
| 72 | trigger of 68 |
| 74 | central drive shaft of 68 |
| 76 | cylindrical head of 68 on 74 |
| 78 | first pawl of 64 |
| 80 | spring of 78 |
| 82 | second pawl of 64 |
| 84 | spring of 82 |
| 86 | tongue of 82 |
| 88 | teeth on 74 |
| 90 | first pawl pivotally mounted between 72 and 64 |
| 92 | second pawl on 64 |
| 94 | stationary nut of 68 |
| 96 | elongated threaded rod of 68 |
| 98 | rotating structure of 68 on 96 |
| 100 | bolt head for 98 |
| 102 | open end wrench |
| 104 | socket head for 98 |
| 106 | ratchet socket wrench |
| 108 | handle rod for 98 |
| 110 | rear chamber of 68 in 64 |
| 112 | inlet port of 110 |
| 114 | transverse drive plate of 68 |

The apparatus 22 for charging the pressurized system 24 comprises a lubricant canister 26. A facility 28 is for fluidly coupling the lubricant canister 26 to the pressurized stem 24. An assemblage 30 is for forcing lubricant 32 out of the lubricant canister 26, through the fluidly coupling facility 28 and into a service valve 34 of the pressurized system 24.

The lubricant canister 26, as shown in FIGS. 1, 4, 5, 13, 15, 17 and 20 includes a tubular casing 36 for holding the lubricant 32 therein. A threaded nozzle 38 is integral with and extends out from a first end of the tubular casing 36, to engage with one end of the fluidly coupling facility 28. A recessed double O-ring piston 40 is inserted within an open second end of the tubular casing 36, to engage with the lubricant forcing assemblage 30.

Figure 4:
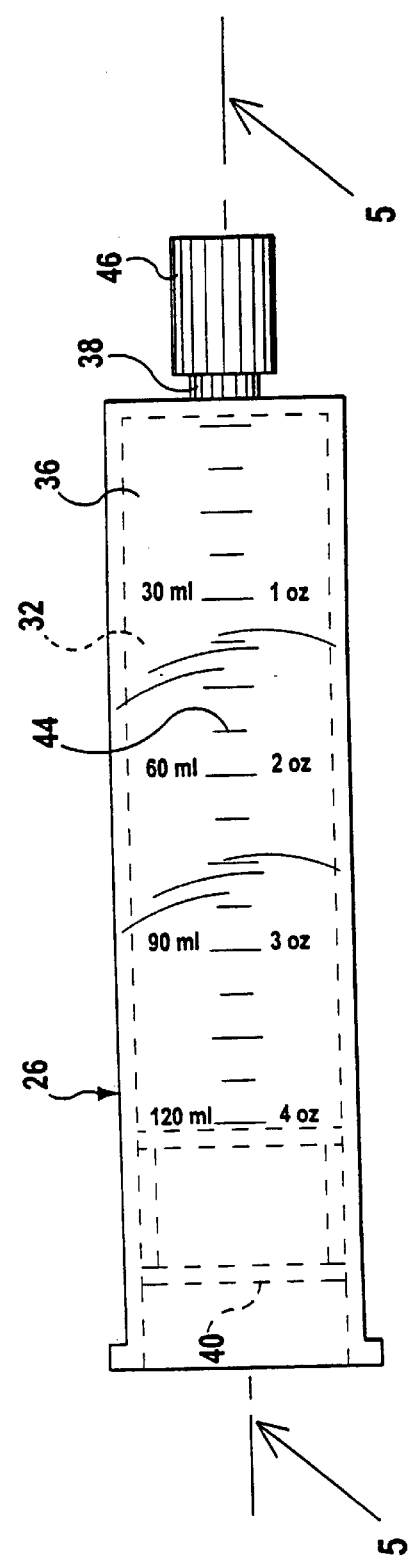
FIG. 4 is an enlarged side of the lubricant canister in FIG. 1.
Figure 5:
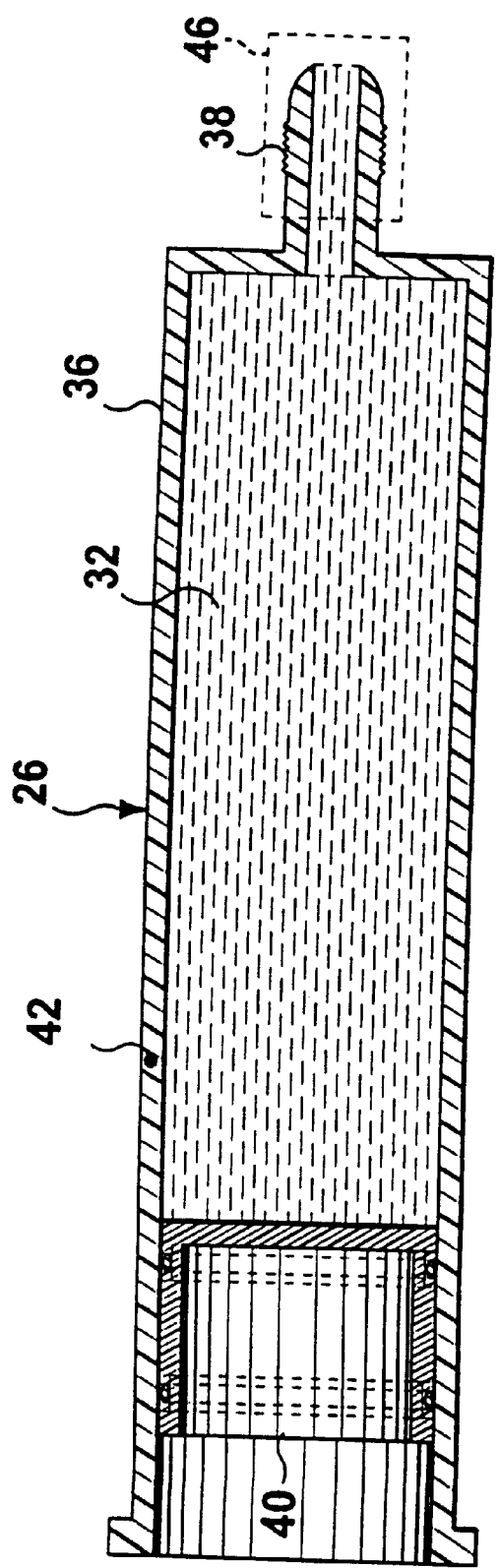
FIG. 5 is a cross sectional view taken along line 5—5 in FIG. 4.
Figure 6:
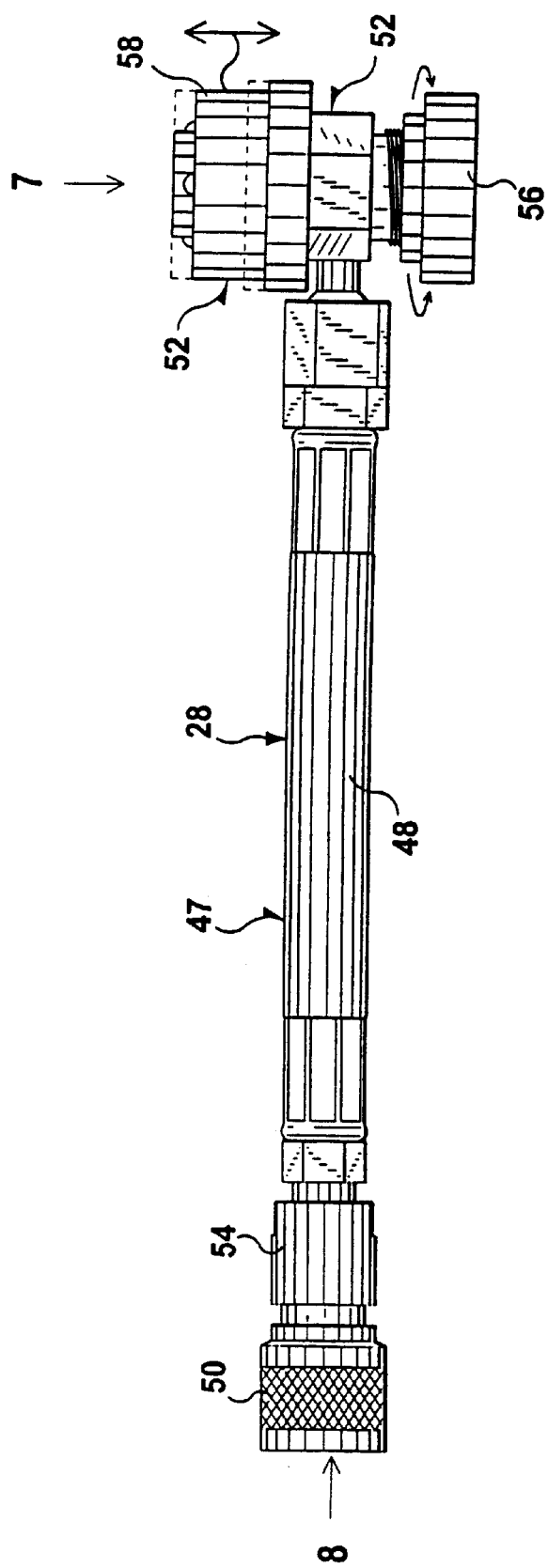
FIG. 6 is a side view of the connector assembly in FIG. 1.
Figure 7:
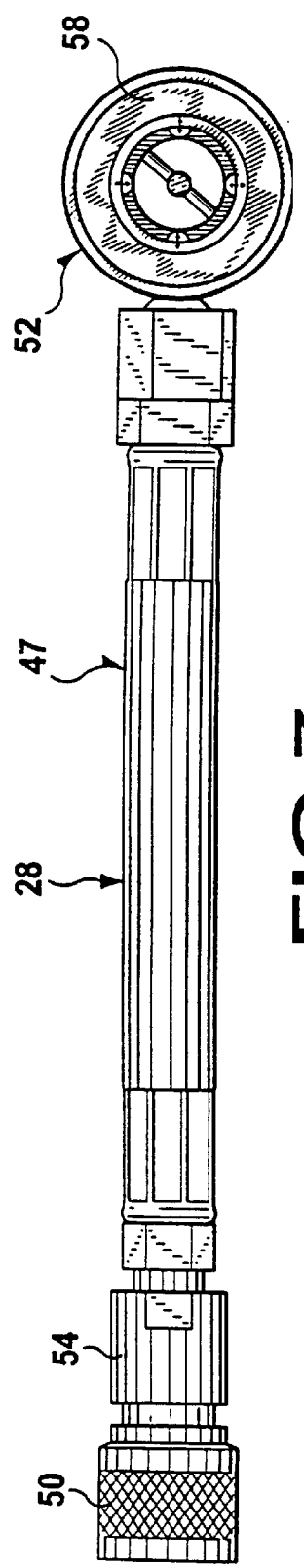
FIG. 7 is a top view taken in the direction of arrow 7 in FIG. 6.
Figure 8:
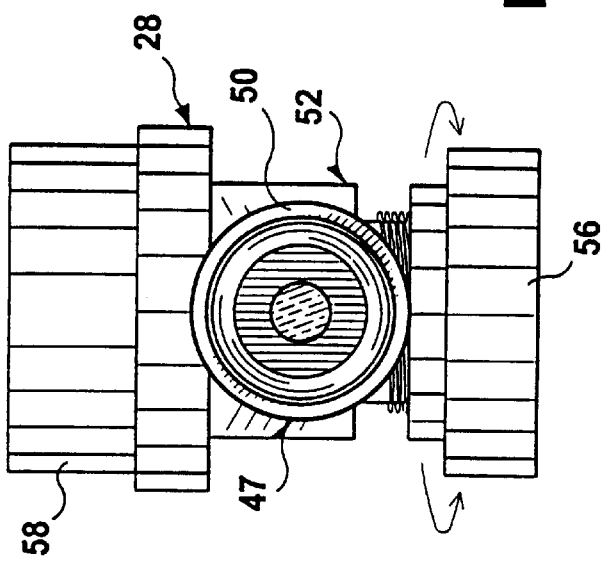
FIG. 8 is an end view taken in the direction of arrow 8 in FIG. 6.
Figure 9:
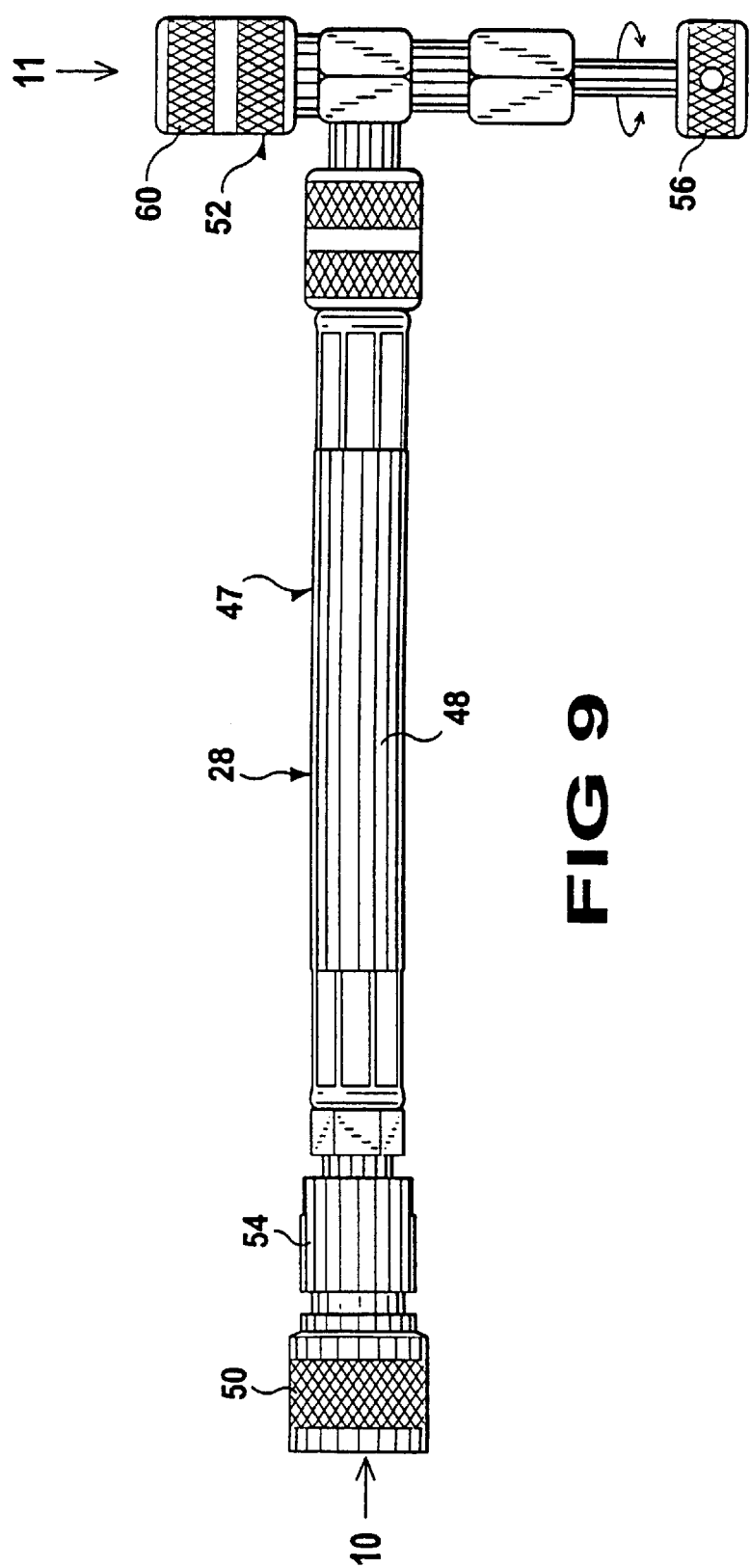
FIG. 9 is a side view of a second embodiment of the connector assembly.
Figure 10:
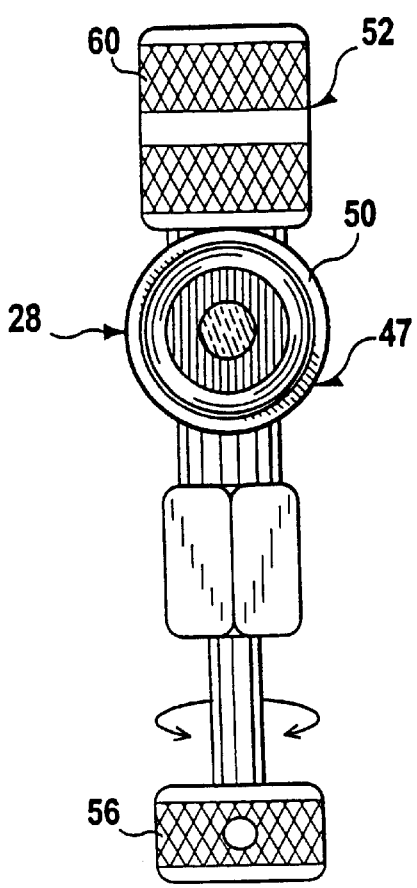
FIG. 10 is an end view taken in the direction of arrow 10 in FIG. 9.
Figure 11:
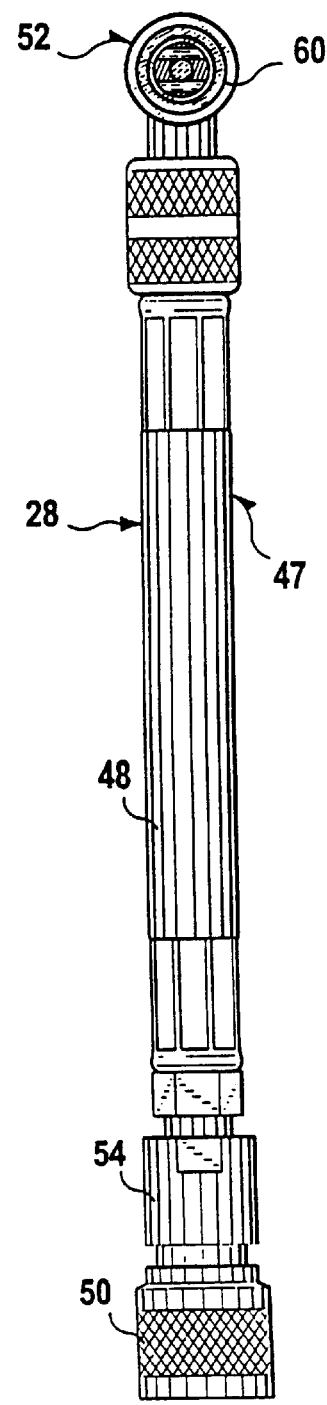
FIG. 11 is a top view taken in the direction of arrow 11 in FIG. 9.

The tubular casing 36 can be fabricated out of transparent material 42 and can include a plurality of gradient markings 44, to aid in accurately dispensing a predetermined amount of the lubricant 32 therefrom. The lubricant canister 26 further includes a threaded cap 46, as shown in FIGS. 4 and 5, to engage with the threaded nozzle 38 when the lubricant canister 26 is not in use, so as to prevent leakage of the lubricant 32 through the threaded nozzle 38.

The fluidly coupling facility 28, as shown in FIGS. 1 and 6 through 11, is a connector assembly 47 having a first end connected to the threaded nozzle 38 of the lubricant canister 26 and a second end connected to the service valve 34 of the pressurized system 24. The connector assembly 47 consists of a flexible conduit 48. A threaded fitting 50 is on the first end of the flexible conduit 48, to engage with the threaded nozzle 38 of the lubricant canister 26. A release valve 52 is on the second end of the flexible conduit 48, to engage with the service valve 34 of the pressurized system 24.

The connector assembly 47 further includes a one-way check valve 54 between the threaded fitting 50 and the first end of the flexible conduit 48, which prevents any material from back flushing into and contaminating the lubricant 32 in the lubricant canister 26. The release valve 52 contains a closeable control knob 56, which prevents any material from back flushing into the flexible conduit 48 from the service valve 34 of the pressurized system 24, and allows the release valve 52 to disconnect from the service valve 34 of the pressurized system 24, to prevent leakage of the lubricant 32 therefrom.

The release valve 52 in FIGS. 1, 6, 7 and 8, includes a snap lock fitting 58 to engage with the service valve 34 of the pressurized system 24. The release valve 52 in FIGS. 9, 10 and 11, includes a threaded fitting 60, to engage with the service valve 34 of the pressurized system 24.

The lubricant forcing assemblage 30, as shown in FIGS. 1 to 3 and 12 to 20, is an injection device 62. The injection device 62 contains a housing 64 having a receptacle portion 66, to receive the lubricant canister 26 therein. A drive mechanism 68 forces the recessed double O-ring piston 40 into the tubular casing 36, to cause the lubricant 30 to exit the threaded nozzle 38 through the fluidly coupling facility 28, past the service valve 34 and into the pressurized system 24.

Figure 2:
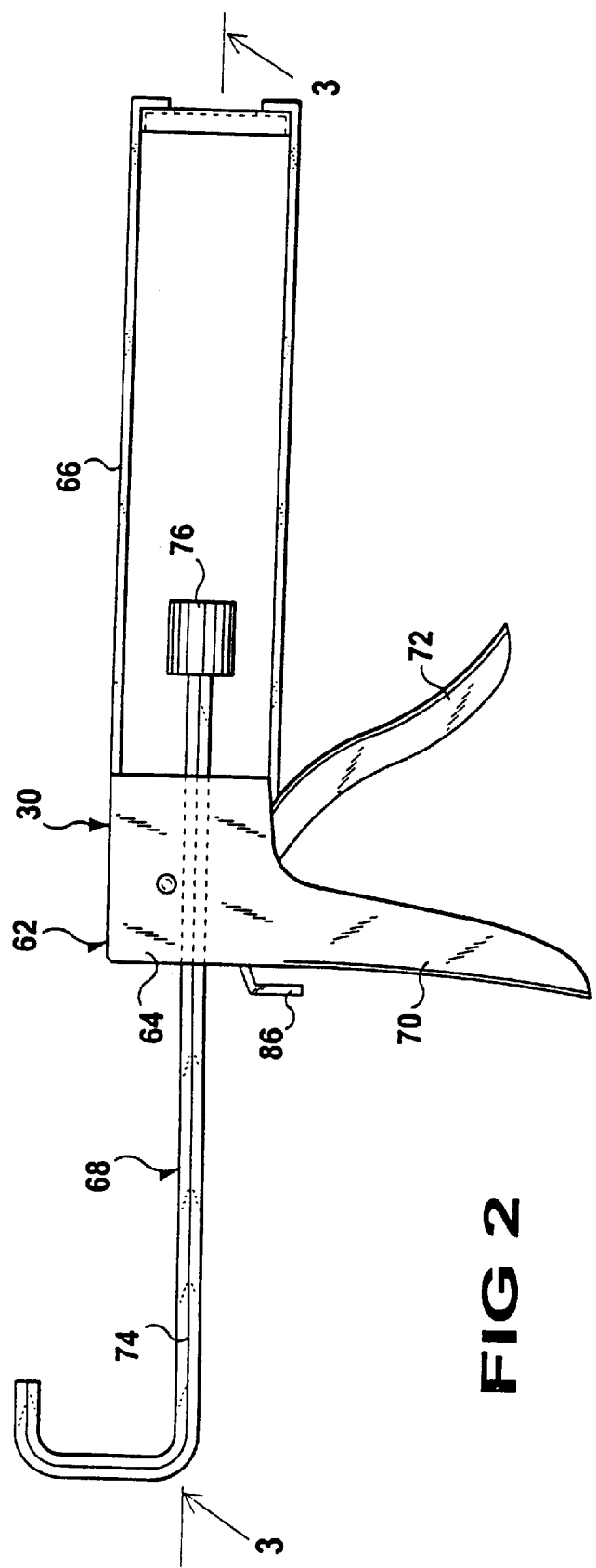
FIG. 2 is an enlarged side view of the injection device shown in FIG. 1.
Figure 3:
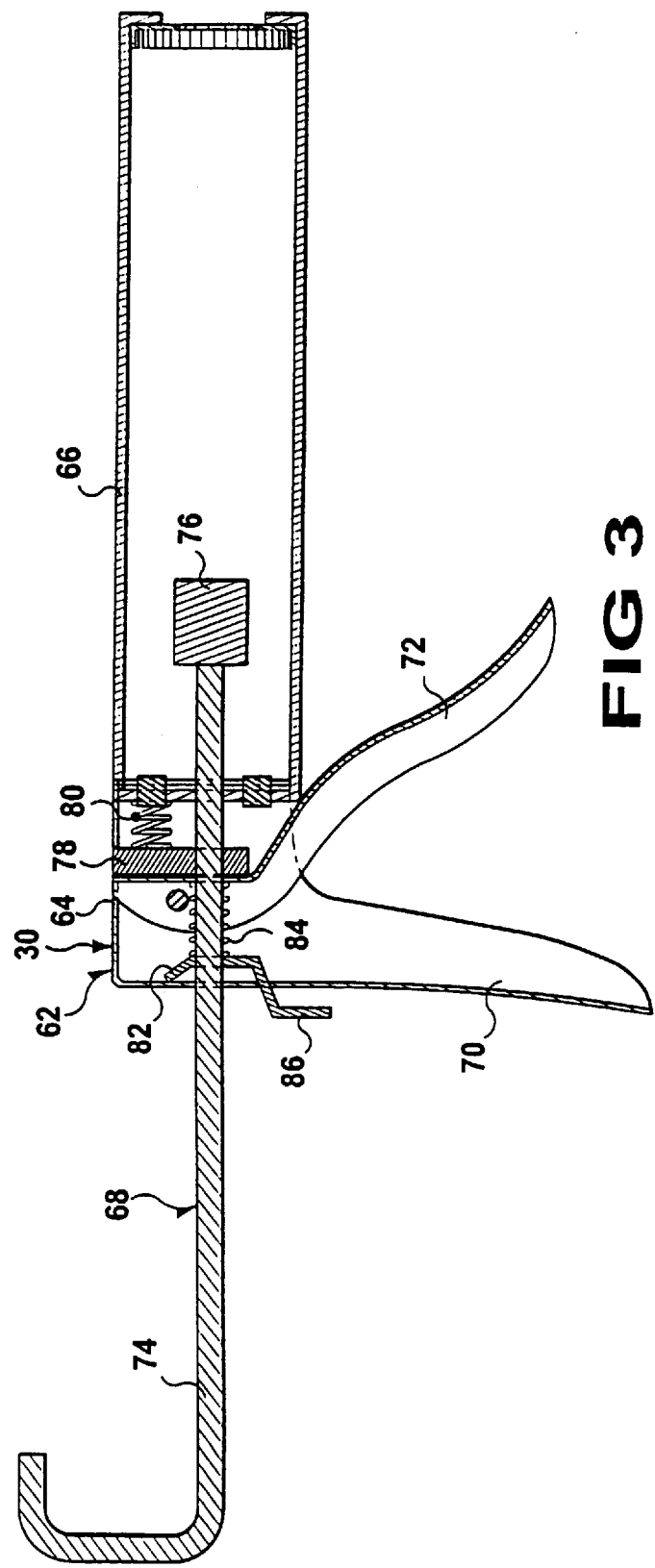
FIG. 3 is a cross sectional view taken along line 3—3 in FIG. 2.

The drive mechanism 68 in FIGS. 1 to 3, includes a hand grip 70 integral with and extending downwardly on the housing 64. A trigger 72 is pivotally mounted to the housing 64 adjacent the hand grip 70. A central drive shaft 74 extends longitudinally through the housing 64 and transversely past a pivotal portion of the trigger 72. A cylindrical head 76 is on an inner end of the central drive shaft 74, to engage with the recessed double O-ring piston 40 of the lubricant canister 26.

A first pawl 78 is spring biased at 80 on the central drive shaft 74 forward the pivotal portion of the trigger 72. A second pawl 82 is spring biased at 84 on the central drive shaft 74 rearward the pivotal portion of the trigger 72. The second pawl 82 has a tongue 86 extending out through a rear wall of the housing 64 above the hand grip 70. When the trigger 72 is squeezed the first pawl 78 will move into contact with the central drive shaft 74, to push the central drive shaft 74 forward with the cylindrical head 76 making contact with the recessed double O-ring piston 40. The second pawl 82 prevents reverse movement of the central drive shaft 74, until the tongue 86 is lifted up to disengage the second pawl 82, allowing the central drive shaft 74 to be pulled back to a desired position.

The drive mechanism 68 in FIGS. 12 to 15, includes a hand grip 70 integral with and extending downwardly on the housing 64. A trigger 72 is pivotally mounted to the housing 64 adjacent the hand grip 70. A central drive shaft 74 extends longitudinally through the housing 64 and transversely above a pivotal portion of the trigger 72. The central drive shaft 74 has a plurality of teeth 88 extending therealong. A cylindrical head 76 is on an inner end of the central drive shaft 74, to engage with the recessed double O-ring piston 40 of the lubricant canister 26.

A pawl 90 is pivotally mounted between the pivotal portion of the trigger 72 and the housing 64. When the trigger 72 is squeezed, the pawl 90 will move into contact with the teeth 88 on the central drive shaft 74, to push the central drive shaft 74 forward with the cylindrical head 76 making contact with the recessed double O-ring piston 40. As best seen in FIGS. 13 and 14, the drive mechanism 68 can include a second pawl 92 spring biased in the housing 64 to make contact with the teeth 88 on the central drive shaft 74 forward the first pawl 90, to prevent reverse movement of the central drive shaft 74.

The drive mechanism 68 in FIGS. 16 to 19, includes a stationary nut 94 mounted vertically within a rear wall of the housing 64. An elongated threaded rod 96 extends longitudinally through the stationary nut 94. A cylindrical head 76 on an inner end of the elongated threaded rod 96 engages with the recessed double O-ring piston 40 of the lubricant canister 26. A structure 98 on an outer end of the elongated threaded rod 96 is for rotating the elongated threaded rod 96 through the stationary nut 94 and moves the elongated threaded rod 96 with the cylindrical head 76 forward, to make contact with the recessed double O-ring piston 40.

The rotating structure 98 in FIGS. 16 and 17, is a bolt head 100, which can be turned by an open end or box wrench 102. The rotating structure 98 in FIG. 18, is a socket head 104, which can be turned by a ratchet socket wrench 106. The rotating structure 98 in FIG. 19, is a handle rod 108 extending transversely through the outer end of the elongated threaded rod 96, which can be turned by a hand of a person.

The drive mechanism 68, shown in FIG. 20, includes a rear chamber 110 formed within the housing 64 and has an inlet port 112 to allow compressed gas to enter the rear chamber 110. A central drive shaft 74 is carried longitudinally within the tubular casing 36 of the lubricant canister 26. A cylindrical head 76 is on an inner end of the central drive shaft 74, to engage with the recessed double O-ring piston 40. A transverse drive plate 114 is on an outer end of the central drive shaft 74 within the tubular casing 36 adjacent the rear chamber 110. When the compressed gas is introduced through the inlet port 112 into the rear chamber 110, the transverse drive plate 114 will push the central drive shaft 74 forward with the cylindrical head 76, to make contact with the recessed double O-ring piston 40.

It will be understood that each of the elements described above, or two or more together may also find a useful application in other types of methods differing from the type described above.

While certain novel features of this invention have been shown and described are pointed out in the annexed claims, it is not intended to be limited to the details y above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A canister for charging a closed, pressurized air conditioning or refrigeration system with a fluid, comprising:

a) a closed, non-pressurized cylindrical canister, wherein said canister has two ends, a first open end which connects to the system being charged and a second open end, and wherein said first open end comprises a nozzle;

b) a predetermined amount of said fluid, wherein said fluid comprises a lubricant and a fluid dye for said air conditioning or refrigeration systems, and wherein said fluid is maintained in said canister at about ambient pressure; and c) a piston sealably disposed with said second open end of said canister, wherein said canister is adapted to sealably and releasably connect to said pressurized air conditioning or refrigeration system via fluidly coupling means to form a closed binary system, wherein said fluidly coupling means is a connector assembly having a first end connected to said nozzle of said canister and a second end connected to a service valve of the pressurized system, wherein said connector assembly comprises:
 i) a flexible conduit,
 ii) a thread on a first end of said flexible conduit, to engage with said nozzle of said canister, and
 iii) a release valve on a second end of said flexible conduit, to engage with the service valve of the pressurized system, and wherein said connector assembly further comprises a valve at one end of said flexible conduit, which prevents any material from back flushing into and contaminating said fluid in said canister.

2. The canister of claim 1, wherein said canister is fabricated out of transparent material and includes a plurality of gradient markings; and wherein said nozzle is threaded.

3. The canister of claim 2, wherein said first open end comprises a threaded cap for engagement with said threaded nozzle.

4. The canister of claim 1, wherein said piston further comprises an O-ring.

5. The canister of claim 1, wherein said piston further comprises a recessed double O-ring.

* * * * *